United States Patent [19]

Magori

[11] Patent Number: 4,885,942

[45] Date of Patent: Dec. 12, 1989

[54] ULTRASOUND FLOW RATE METER USING A PHASE DIFFERENCE METHOD AND APPARATUS

[75] Inventor: Valentin Magori, Muenchen, Fed. Rep. of Germany

[73] Assignee: Siemens Aktiengesellschaft, Berlin and Munich, Fed. Rep. of Germany

[21] Appl. No.: 99,782

[22] Filed: Sep. 22, 1987

[30] Foreign Application Priority Data

Sep. 30, 1986 [DE] Fed. Rep. of Germany ....... 3633228

[51] Int. Cl.$^4$ .............................................. G01F 1/66
[52] U.S. Cl. ................................................ 73/861.28
[58] Field of Search ......................... 73/861.28, 861.27

[56] References Cited

U.S. PATENT DOCUMENTS 4,331,025 5/1982 Ord, Jr. ............................ 73/861.28
4,384,491 5/1983 Brown et al. ..................... 73/861.28

FOREIGN PATENT DOCUMENTS 2724661 11/1978 Fed. Rep. of Germany .

Primary Examiner—Jerry W. Myracle

[57] ABSTRACT

An ultrasound of flow rate meter which uses the phase difference method wherein two ultrasound transducers W1 and W2 are mounted offset but aligned with each other in a tube through which the velocity of flow is to be measured wherein both of the ultrasound transducers are excited in a pulse manner by an oscillator OS2 and wherein receiving amplifiers V1 and V2 are, respectively, associated with the ultrasound transducers W1 and W2. Evaluation devices are connected after amplifier V1 and V2 such that the phase relationship of the signals at the outputs of the receiving amplifiers V1 and V2 is determined during the reception of ultrasound signals. The phase relationship between the signals at the ultrasound transducers is also determined during transmission of ultrasound signals and this phase difference is used as a reference during reception of ultrasound signals.

4 Claims, 2 Drawing Sheets

FIG. IA 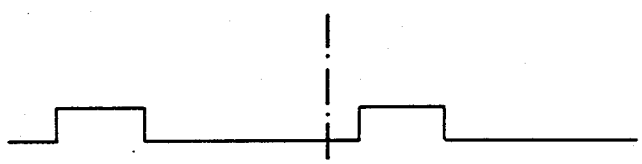
FIG. IB 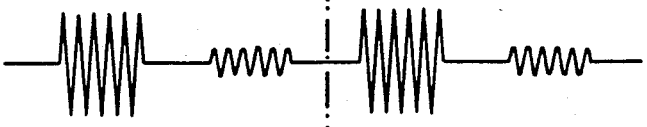
FIG. IC 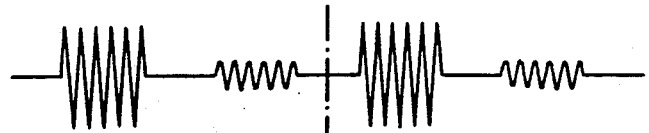
FIG. ID 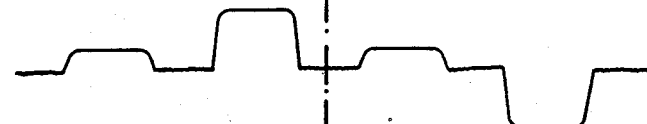
FIG. IE 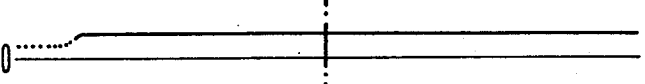
FIG. IF 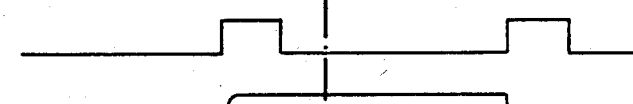
FIG. IG 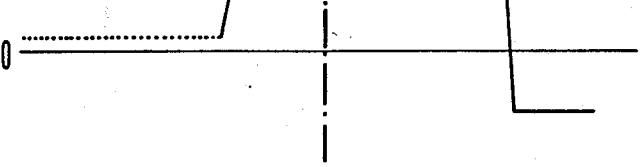

ULTRASOUND FLOW RATE METER USING A PHASE DIFFERENCE METHOD AND APPARATUS

BACKGROUND OF THE INVENTION

1. Field of the Invention

This invention relates in general to flow rate measuring devices using ultrasound wherein the phase of ultrasound signals which travel through the fluid in the upstream and downstream direction are different.

2. Description of the Prior Art

Prior art methods and apparatus for measuring flow rates using ultrasound based upon phase differences of the ultrasound signals have the disadvantages that 1) three ultrasound transducers must be utilized, 2) the upstream and downstream measuring paths are not identical, and 3) the zero phase is usually not specified in the integrated circuits utilized and the circuits must therefore be individually balanced. It is thus not assured that the balancing will be maintained when temperature changes and aging effects occur.

German published application No. 27 24 661 avoids the disadvantages 1 and 2 listed above by providing that clocked sound signals which are referred to as "sound bursts" of identical sound frequencies are simultaneously emitted by both transducers. The two "sound bursts" travel the measuring paths in opposite directions and impinge upon the other sound transducer almost simultaneously and are converted back into electrical signals. The chronological lengths $t_B$ of the sound burst is selected such that the sound transducers are no longer transmitting at the arrival time of the received signals:

$$t_B \leq L/c \tag{1}$$

where L represents the length of the measuring path and c represents the speed of sound.

The phase difference $\Delta\phi$ of the two signals which travel in different directions is a measure of the flow rate v:

$$\Delta\phi = \frac{4\pi f L v}{c^2} \tag{2}$$

where f is the frequency of the transmitted signals.

SUMMARY OF THE INVENTION

It is an object of the present invention to provide an ultrasound flow rate meter which eliminates disadvantages of the prior art wherein the zero phase point is generally not specified in the integrated circuits utilized in the equipment and must therefore be individually balanced.

It is an object of the present invention to provide an ultraflow rate meter wherein two ultrasound transducers are mounted in a measuring tube aligned with each other in the flow direction and wherein they are excited by an oscillator in a clocked fashion and wherein receiving amplifiers connected to each of the ultrasound transducers receive the reception signal and supply outputs to evaluation units and wherein the phase relationship of the signals at the outputs of the reception amplifiers are evaluated during transmission and also the identified phase difference is used as a reference for the phase relationship during reception.

It is another object of the invention to provide multiplying mixers which are cross-connected to the output of the receiving amplifiers and supply output to an adder which supplies outputs to a pair of sample and hold circuits, one of which is clocked by a transmission clock signal and the other is clocked by a receiver clock signal and wherein the sample and hold circuits supply an output to an evaluation device.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIGS. 1A through 1G are plots of wave shapes as a function at time which illustrate the measuring procedure.

DESCRIPTION OF THE PREFERRED EMBODIMENTS

Figure 2:
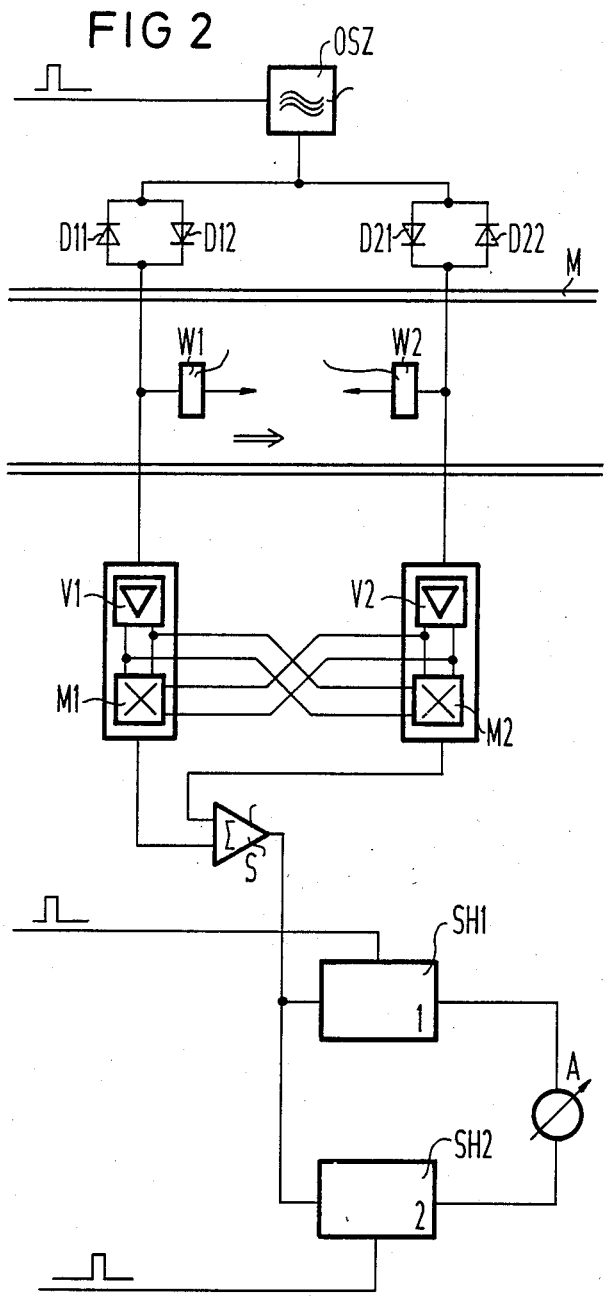
FIG. 2 is a block diagram of the measuring system according to the invention.

In the invention, the two receiving amplifiers are always connected to the two ultrasound transducers. The phase relationship between the signals at the sound transducers are evaluated during transmission and this phase difference is used as a reference against which the phase difference during reception is compared as shown in FIGS. 1A through 1G.

The apparatus of the invention is illustrated in FIG. 2 wherein a tube M through which fluid passes in the direction of the arrow has mounted therein a pair of ultrasound transducers W1 and W2 which are spaced from each other and aligned with each other so that signals transmitted by either of the transducers will be detected at the other transducer after passing through the fluid in the tube M. A first receiving amplifier V1 is connected to the transducer W1 and a second amplifier V2 is connected to receive the output from the transducer W2. A transmitting signal keys an oscillator OSZ which supplies an input through the back-to-back diodes D11 and D12 to the transducer W1. The oscillator also supplies output through the back-to-back diodes D21 and D22 to the transducer W2 as illustrated.

The signals adjacent the ultrasound transducers W1 and W2 are evaluated during transmission of the ultrasound signals and the phase difference which is identified is used as a reference during reception as illustrated by the waveforms of FIGS. 1A through 1G.

The back-to-back diodes pairs D11/D12 and D21/D22 function as transmission/reception switchovers for each of the ultrasound transducers W1 and W2. The outputs of the ultrasound transducers W1 and W2 are respectively directly connected to the inputs of the associated receiving amplifiers V1 and V2. The outputs of the amplifier V1 are connected to first inputs of a multiplying mixer M1 and to second inputs of a second multiplying mixer M2. The outputs of the amplifier V2 is connected to first inputs of the second multiplier mixer M2 and to second inputs of the first multiplying mixer M1 as shown. The outputs of the multiplying mixers M1 and M2 are supplied to a summing or adding stage S. The output of the summing stage S is supplied to a first sample and hold circuit SH1 and to a second sample and hold circuit SH2. The outputs of the sample and hold elements SH1 and SH2 are supplied to an evaluation means A which indicates the velocity of the fluid through the tube M. A transmitter clock pulse is supplied to the first sample and hold circuit SH1 so as to actuate it and a receiver clock pulse is supplied to the second sample and hold circuit SH2. The second electrical terminals of the ultrasound transound W1 and W2 are connected to a shared operating potential source.

The output signals of the sample and hold elements SH1 and SH2 are preferably subjected to a digital subtraction not shown for the formation of a digital phase difference signal. It is also possible that the output signals of the sample and hold elements SH1 and SH2 can be supplied to a forward/backward counter so as to form a digital phase difference signal wherein the counter reading represents the particular phase difference which occurs. Such elements may form part of the evaluation means A, for example.

The two transducers W1 and W2 are each connected through the back-to-back diodes which act as transmission/reception switchovers. The output of the two receiving amplifiers V1 and V2 are connected in cross-fashion to the inputs of the multiplication mixers M1 and M2 as shown so that a phase difference of the signal causes a complementary change of both output voltages from the multiplication mixers M1 and M2. The sum of the output voltage of the mixers M1 and M2 is stored during transmission in the first sample and hold element SH1 and is stored during reception in the second sample and hold element SH2. The difference between the two stored values indicates the flow rate of the fluid in the tube M.

A direct evaluation of the AC voltage which results at the output of the phase modulator would be another possible method of evaluation. This could occur with very little circuit outlay using synchronous rectification of the AC voltage at the output of the summing circuit S in a known manner. A high suppression of extraneous signals occurs in this embodiment and the two sample and hold elements SH1 and SH2 could be eliminated from the circuit.

FIGS. 1A–1G illustrate the various signals which occur at different points in the circuit of FIG. 2. For example, FIG. 1A illustrates the transmitting signal. FIG. 1B illustrates the signal at the transducer W1, waveform of FIG. 1C illustrates the signals at transducer W2. The wave shape of FIG. 1D illustrates the signal at the summing circuit S. FIG. 1E illustrates the signal at the first sample and hold circuit SH1. FIG. 1F illustrates the clock signal for the second sample and hold circuit SH2. FIG. 1G illustrates the signal at the second sample and hold circuit SH2.

Although the invention has been described with respect to preferred embodiments, it is not to be so limited as changes and modifications can be made which are within the full intended scope of the invention as defined by the appended claims.

I claim as my invention:

1. An ultrasound flow rate meter based on measuring the phase difference, comprising, a tube in which fluid flows, first and second ultrasound transducers mounted in said tube along the flow axis of said tube to transmit and receive ultrasound energy, an oscillator connected to said first and second ultrasound transducers and periodically transmitting ultrasound signals, first and second reception amplifiers, respectively, connected to said first and second ultrasound transducers, an evaluation unit connected to said first and second reception amplifiers and evaluating the phase relationship of the signals occurring at the outputs of said first and second reception amplifiers and evaluating them during reception of ultrasound signals, each of said first and second reception amplifiers (V1, V2) respectively permanently connected to said first and second ultrasound transducers (W1, W2) and the phase relationship of the signals from said first and second ultrasound transducers (W1, W2) evaluated during the transmission of ultrasound signals and the phase difference so determined during transmission used as a reference signal to determine the phase difference of the signals during reception.

2. An ultrasound flow rate meter according to claim 1, including first and second pairs of back-to-back diodes (D11/D12, D21/D22) which operate as a transmission/reception switch-overs respectively connected between the inputs to said first and second ultrasound transducers (W1, W2) and the output of said oscillator (OSZ), said first and second ultrasound transducers (W1, W2), respectively, directly connected to the inputs, respectively, of said first and second reception amplifiers (V1, V2); first and second multiplication mixers each connected to the outputs of said first and second reception amplifiers (V1, V2), a summing stage (S) connected to receive the outputs of said first and second multiplication mixers (M1, M2), first and second sample and hold elements (SH1, SH2) connected to the output of said summing stage (S), an evaluation means connected to the outputs of said first and second sample-and-hold elements (SH1, SH2), an activation input for said first sample-and-hold element (SH1) supplied with a transmission clock signal, and an activation input for said second sample-and-hold element (SH2), supplied with a reception clock signal; and second electrical terminals of said first and second ultrasound transducers (W1, W2) connected to a shared source of operating potential.

3. An ultrasound flow rate meter according to claim 2, wherein the input signals of said first and second sample-and-hold elements (SH1, SH2) are subjected to digital subtraction to form a digital phase difference signal.

4. An ultrasound flow rate meter according to claim 2, wherein the output signals of said first and second sample-and-hold elements (SH1, SH2) are supplied to a forward/backward counter for forming a digital phase difference signal and the counter reading of said counter comprising the desired phase differences.

* * * * *